Feb. 8, 1949.    E. C. BITZER    2,460,802
METHOD OF STARTING A FINE HEAVY
MEDIA SEPARATION PLANT
Filed Jan. 9, 1945    3 Sheets-Sheet 1

SYMBOLS
- - - - shore line
——— plane of spiral
✱✱✱ ore
✱✱✱ rock or gangue

EDMUND C. BITZER
INVENTOR.

BY

*H. A. McGrew*

ATTORNEY

Feb. 8, 1949.  E. C. BITZER  2,460,802
METHOD OF STARTING A FINE HEAVY
MEDIA SEPARATION PLANT
Filed Jan. 9, 1945  3 Sheets-Sheet 2
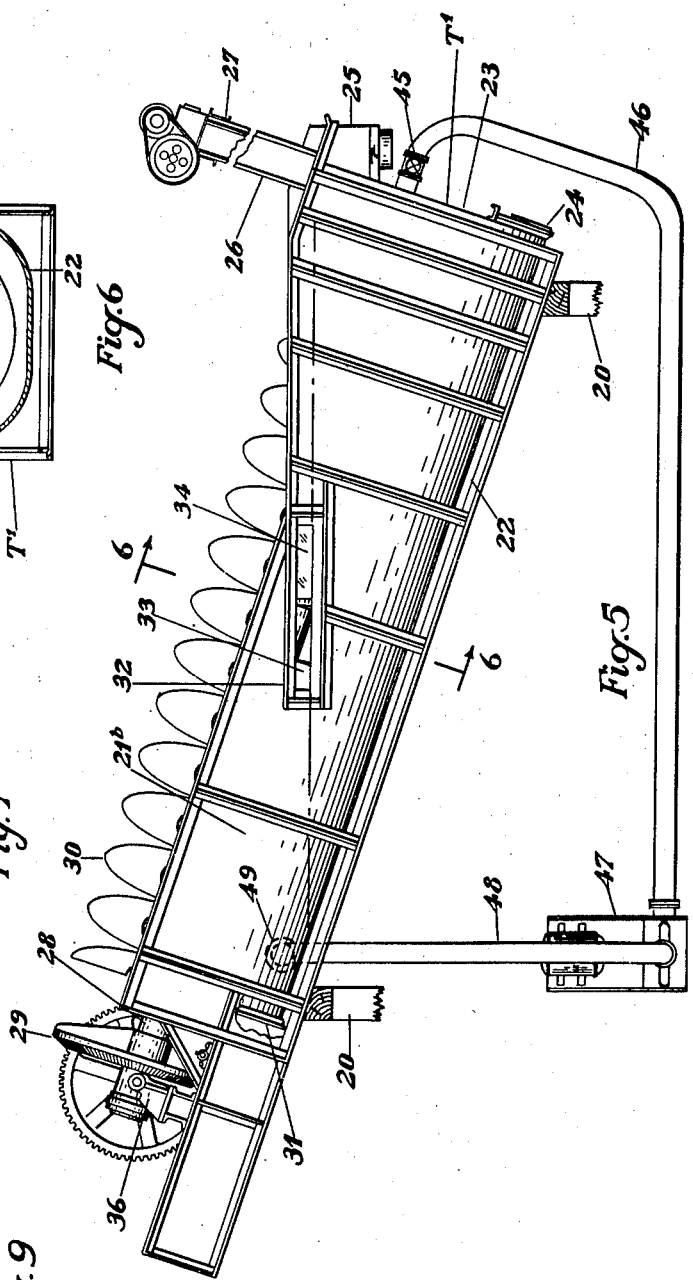
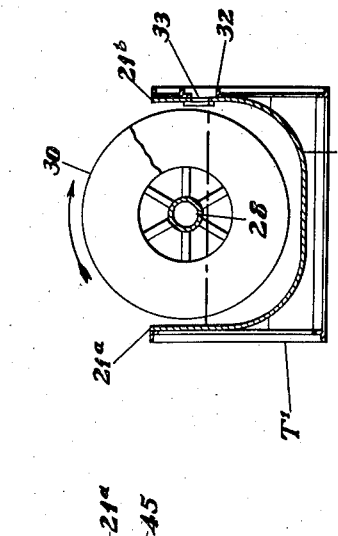
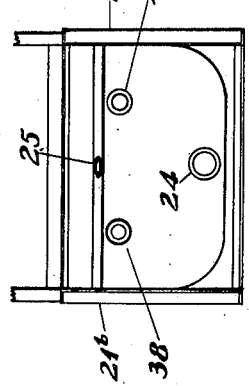
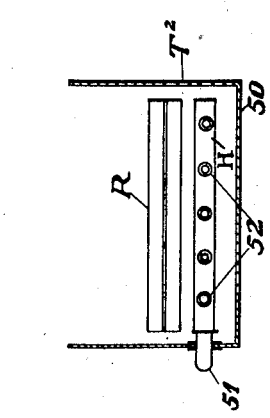
EDMUND C. BITZER
INVENTOR.
BY
*H. A. McGrew*
ATTORNEY Feb. 8, 1949.  E. C. BITZER  2,460,802
METHOD OF STARTING A FINE HEAVY
MEDIA SEPARATION PLANT Filed Jan. 9, 1945  3 Sheets-Sheet 3

EDMUND C. BITZER
INVENTOR.

BY
*H. A. McGrew*
ATTORNEY

Patented Feb. 8, 1949

2,460,802

UNITED STATES PATENT OFFICE 2,460,802

METHOD OF STARTING A FINE HEAVY MEDIA SEPARATION PLANT

Edmund C. Bitzer, Golden, Colo., assignor to Colorado Iron Works Company, Denver, Colo., a corporation of Maine Application January 9, 1945, Serial No. 571,999

2 Claims. (Cl. 209—173)

This invention relates to methods and means for performing heavy-media separations, which apply generally to such treatments using either magnetic or non-magnetic media.

Heretofore in this art, the apparatus used in making the separation of the sink and float products usually has been a cone separator in which the sink product is caused to descend through the cone from top to bottom by gravity, while the float product because of its lesser specific gravity and certain elevating components of the treatment is overflowed at the top. Various kinds of media are used in such treatments, both ferrosilicon and galena in particular, having been used extensively.

Some attempts have been made to utilize other types of apparatus for this purpose, but to date such devices have not come into widespread commercial use. In my copending application, Serial No. 498,743, now Patent No. 2,428,777, October 14, 1947, filed August 16, 1943, for Method and apparatus for heavy-media separations, I have disclosed a modified form of Akins-type classifier, designed to perform heavy-media separations. Features described but not claimed herein have been claimed in the aforesaid application.

The separation disclosed in the earlier application involves the treatment of material in two physically separated but communicating pools, in one of which the incoming feed is introduced and subjected to an initial separation and one product of this initial separation then passes into the other said pool and is subjected to a secondary separation and ultimate removal therefrom. The passage from one pool to the other is substantially restricted and because of this, the treatment capacity of the unit is limited.

It is an object of the present invention to provide a simple and efficient heavy-media separation in which the constituents are treated in a substantially quiescent pool of relatively large surface area and caused to separate in accordance with variations in densities in different zones of the pool.

Another object of the invention is to provide a heavy-media separation in which the density of the medium of the treatment may be varied in accordance with fluctuations in feed.

A further object of the invention is to provide a zone of heavy-media separation extending over a substantial superficial area in which the material under treatment is subjected to progressive separation influences of increasing amplitude.

Other objects of the invention reside in novel steps and treatments all of which will be fully explained in the course of the following description.

Briefly stated, the present invention resides in the discovery that by controlling the dimension of the treatment zone, the rate of movement of material therethrough and the densities therein, a substantially clean separation of mineral and rock can be obtained with only minor quantities of heavy media passing from the treatment with each said product of the separation.

This control is accomplished by treating the material in a substantially quiescent pool having an inclined bottom and of substantial superficial area, in which the rate of movement of the settled material is proportioned to the settling rate of such material in the media of the treatment. Preferably such treatment is performed in classifier apparatus of the Akins type having a side feed and end overflow, with the feed inlet adjustable to vary the point of feed introduction lengthwise of the pool. Also, the rate of rotation of the spiral conveying or raking member should be variable to permit changes in the interval of material retention within the pool, thereby controlling the quality of the raked product.

The accompanying drawings illustrate features in the practice of the invention and apparatus suitable for performing the process of the invention. In the drawings in the several views of which like parts have been designated similarly, Fig. 1 is a partial top plan view of apparatus in which the process of the present invention is being performed;

Fig. 5 is a fragmentary side elevation of apparatus suited for performing the process of the present invention;

Fig. 6 is a section taken along the line 6—6, Fig. 5;

Fig. 7 is a fragmentary end elevation of the separator apparatus shown in Fig. 5;

Fig. 9 is a section through another form of separator apparatus embodying features of the present invention.

Figure 1:
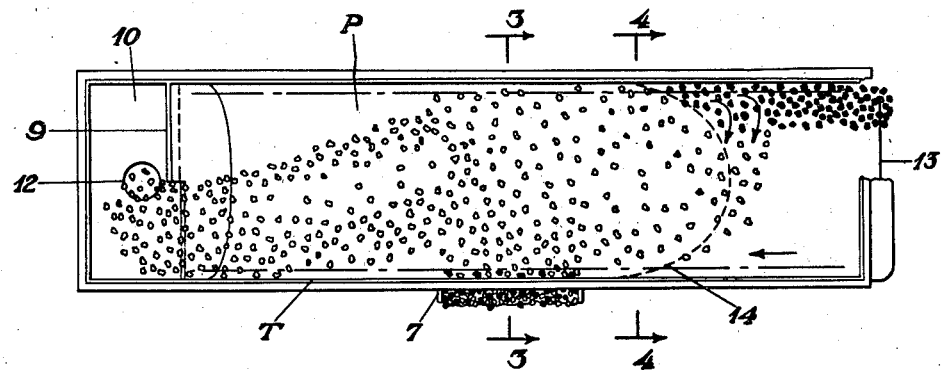
Figure 2:
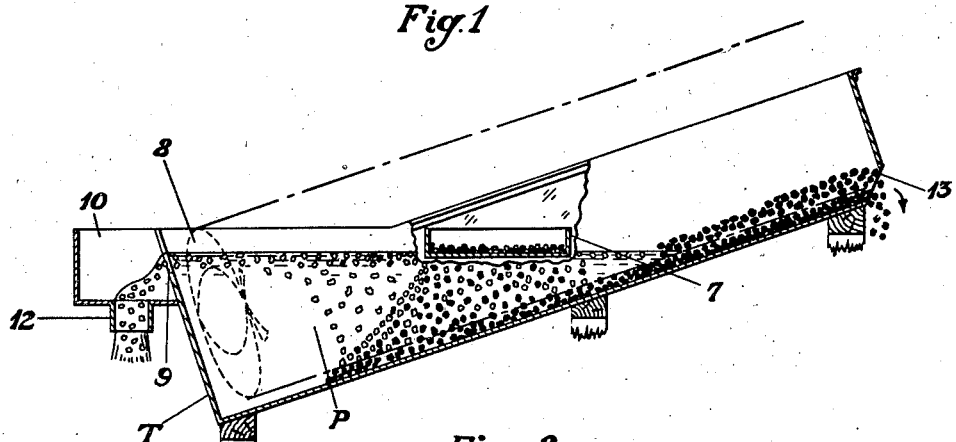
Fig. 2 is a fragmentary central section through the apparatus of Fig. 1 illustrating the sequence of separation performed in the practice of the present invention.
Figure 3:
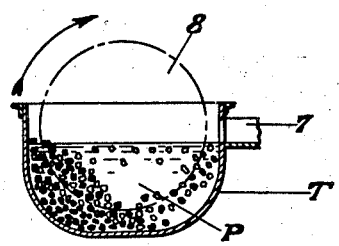
Fig. 3 is a section taken along the line 3—3, Fig. 1, and illustrating one stage of the separation.
Figure 4:
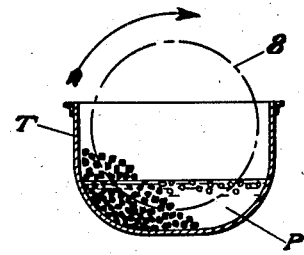
Fig. 4 is a section taken along the line 4—4, Fig. 1, and illustrating another stage of the separation.

The treatment illustrated in Figs. 1 through 4 is typical of the type of separation obtained in the treatment of iron ore using ferrosilicon as the medium. The ore, which comes to the treatment in an essentially dry condition, preferably is mixed with incoming media to form a pulp. A suitable quantity of ferrosilicon is initially introduced into the tank and then the incoming ore, or the ore-media pulp, is fed into the tank T through a side feed box 7, and distributes throughout the pool P. In this action the pulp constituents of high specific gravity settle to the bottom and form a bed which is moved through and out of the pool by the conveyor mechanism, preferably a spiral-type conveyor indicated by the dotted line position 8 in Fig. 2.

The heavy media forms an intermediate zone in the pool which is sufficiently dense to float the low specific gravity gangues, regardless of size. Consequently the gangue or float material spreads out on the surface of the pool and ultimately passes across weir overflow 9, here shown as an end overflow, and is collected in an overflow box or launder 10 having a suitable outlet 12. The raked solids are moved by spiral 8 to an elevated point of discharge 13.

The action of the spiral 8 in raking the bed of settled solids serves to direct the settled solids toward a side wall of the tank and produces a progressive increase in density of the bed as it moves through and out of the pool. In continuous operation, the incoming pulp stream will entrain some float material with the settling solids which carries through the heavy-media zone. However, the increasing density of the raked bed serves to crowd out the float material which upon reaching the liquid zone is displaced by the heavy media and caused to rise until it again reaches the surface.

Throughout the pool, and particularly at the shore line 14 adjacent discharge lip 13, the settled bed is so dense that float particles or pieces are unable to penetrate same, even when brought repeatedly in contact with the bed. In this treatment the float material has unobstructed movement at the surface of the pool, although the overflow location induces a pronounced current between the feed box 7 and the overflow end of pool P. Consequently, the float material released from the bed and particularly along shore line 14 works along the surface until it is drawn by the aforesaid current to the overflow weir.

The aforesaid sorting action by which the float material is maintained at or near the surface and caused to travel to the overflow weir is due, in part at least, to the initial entrainment of substantial amounts of the medium in the settled bed. As the density of said bed is increased by the raking action, the medium is crowded from the bed and because of its higher specific gravity sweeps from the bed any float material which it encounters and elevates this material to the lighter density zone adjacent the surface.

By raking the bed of material to an elevated point of discharge above the surface of the pool, and compacting the bed throughout the range of said movement, entrained medium and float material continues to drain from the bed even after it is moved out of pool P. Therefore, by proper control of the rate of elevating movement, it is possible to substantially free the raked bed from contaminating matter, either medium or float material, whenever such a clean separation is desired.

Also, by providing a pool of relatively large and unobstructed surface, and preferably of oblong shape, in which the point of overflow is distant from the shore line across which the raked bed is moved, an effective separation is obtained in size ranges finer than those amenable to separation in conventional heavy-media treatments.

This clean separation of both the float and sink products greatly simplifies the circuit in which such operation is performed, as the secondary cleaning steps for recovery and reconditioning of the media may be performed satisfactorily with much less apparatus than has been customary in the past.

With this understanding of the method of heavy media separation involved in the practice of the present invention, the apparatus shown in Figs. 5 and 6 will be described as being well suited to perform said method. This apparatus comprises a tank T' supported in an inclined position on suitable structural members 20. The tank has side walls 21a and 21b connected by a curved bottom portion 22. The lower end wall 23 has a normally-closed drain opening 24 and a top overflow weir (not shown) over which the float material passes to a discharge box 25. Suitable superstructure 26 at the lower end of the tank supports elevating mechanism 27, the function of which will be described hereinafter.

A rotary shaft 28 driven by suitable gearing 29 from a prime mover (not shown) supports a spiral assembly 30, which acts on the bed of settled solids in the tank to move same along the bottom to a discharge lip 31. Ore is introduced into the tank from a feed box 32 through an opening 33 in wall 21b, the effective size and location of which may be varied by placing slats 34 of different sizes at various positions adjacent said opening. The adjustment of the overflow weir at the top of the wall 23 determines the elevation of the surface of the pool which is formed in the tank, said position being indicated by the dot-dash lines in Figs. 5 and 6.

The shaft 28 is supported for rotation at its upper end in a swivel bearing 36, and by operation of mechanism 27 which is connected with the lower end of shaft 28, said shaft may be disposed for operation at different angular positions lengthwise of the tank with consequent change in the spacing of spiral assembly 30 from the tank bottom 22. In performing the process hereinbefore described in apparatus of the type shown in Figs. 5 and 6, not only does the solids bed compact and become more dense as it is elevated along bottom 22, but at any elevation along the bottom and within the pool, the lowermost strata of said bed is more dense than the portion thereof which is bordering the heavy media zone.

Advantage is taken of this condition in operation to normally position the shaft at an elevation above its lowermost operating position, and then if feed fluctuations occur which show the need for an increase in density within the pool, the rakes are lowered to their lowermost position and thereby throw more high density solids into suspension and thus increase the density of the pool.

In accomplishing this density increase, the position of the spiral must be above its lowermost operating position. The advantage of this control feature will be best understood by reference to the circuit arrangement shown in Fig. 8. The tank T' which is a duplicate of tank T' of Fig. 5 has a valve-controlled outlet 38, which is connected to the inlet side of a centrifugal pump C' by a pipe or conduit 39. The pump discharge passes through another conduit 40 to provide the feed to a sink product drainage screen D. The sink product after drainage at unit D passes as the feed to the sink product washing screen W.

The underflow of unit D returns through a conduit 41 to another pump (not shown) which supplies medium to the separator, and this medium is approximately at the same density at which the sink-float separation takes place. The underflow of unit W passing into another conduit 42 is a very dilute mixture of medium, fine gangue particles and water, due to the wash water introduced onto the deck of the screen through nozzles 42, and this mixture must be treated by magnetic concentration and dewatering operations before it is suitable for use in the separator.

In the operation of tank T', at any given position of the spiral the entire medium system is in equilibrium as regards specific gravity, due to constant overflow from the separator and constant raking out of settled medium with the concentrate. The density of the medium is increased by lowering the spiral conveyor, which results in raking out medium that has settled under the spiral and is, in effect, stored under the pool.

The medium that is raked out by the conveyor discharges with the sink product onto drainage screen D. Since the underflow of this screen is returned directly to the separator by conduit 41, it is necessary to wash through the screen the medium that is removed from storage in the tank, for unless this is done, a large portion of the medium will be transferred to washing screen W. To accomplish the washing on screen D, it is necessary to use medium from the system that is already at a density suitable for the sink-float separation. If this is done the density of the underflow entering conduit 41 is automatically increased and the average density of the pool in the separator is thereby increased.

However, if the spiral is raised to a higher operating position the equilibrium of the system is immediately disturbed, due to the fact the medium will settle out of suspension and come to rest in the space between the bed in the tank and the lower line of the spiral in its new position. The ratio of medium to water in the overflow will thus become less and the specific gravity of the overflow mixture will automatically become lower. Since this overflow is in closed circuit with the pool of medium in the tank, the specific gravity of the pool which determines the sink and float properties of the ore feed will automatically become lower than under the former condition.

Another feature of the operating control provided by the apparatus shown in Figs. 5 and 6 is the adjustment of the feed inlet. I have found that the distance of the point of feed introduction from the overflow is a factor in the cleanness of the separation, and a variation of even a foot one way or another will have a pronounced effect on the separation. With the adjustable slat arrangement previously described, it is possible to vary the point of feed introduction substantially and thus permits a given piece of apparatus to treat efficiently variations in ores, either from one deposit or from a variety of deposits.

In operating in the manner hereinbefore described, it is also possible to control the cleanness of the separation by controlling the rate of conveying movement of the settled bed. By providing an adequate period of retention of the settled solids within the pool and an adequate drainage interval for the solids as they ascend to the point of discharge above the pool, optimum separating conditions can be maintained. However, it usually is easier to regulate the point of pulp introduction than to change the speed of the conveyor mechanism, and such regulation will produce the desired results.

Another feature of the apparatus shown in Figs. 5 and 6 is the convenient arrangement for starting the separator after shutdowns without depleting the tank of its medium content. In the case of a shutdown, the large quantity of medium in suspension settles and must be put into suspension again before ore feed can be introduced into the separator. This must be done without substantial removal of medium, as a prohibitive loss of time will be suffered if the medium is removed and then recycled back to fill the tank.

After a shutdown the spiral must be in a position sufficiently elevated so that it may be started without interference from settled solids. When operations resume the spiral is lowered gradually into the settled solids which are moved up and out of the pool by the action of the spiral. If this operation is allowed to proceed on uninterruptedly, a substantial part of the settled medium is removed from the tank and discharged into the medium recovery system involving a relatively long treatment interval before the original content is recycled back into the tank.

However, if a valve-controlled outlet 45 (Fig. 5) is opened before the spiral is started, liquid will be drawn out of the upper portion of the pool and flow through a conduit 46 to a pump 47. As here shown, this pump is a separate unit for recycling, but if desired, may be the existing pump of the milling circuit. Operation of the pump serves to deliver the drawn-off liquid through another conduit 48 into a side opening 49 adjacent bottom 22 near its upper limit. With the direction of spiral rotation as shown in Fig. 6, the opening 49 is located on the side of the tank along which the settled solids travel to the elevated point of discharge. The flow of liquid entering through said opening will wash the medium thus being conveyed back into the pool. During continuance of this action, the spiral is progressively lowered and the density of the liquid being circulated in the action increases progressively until the spiral is in its normal operating position at which time the entire contents of the pool will be completely mixed and at a proper density for operation. As soon as the spiral is in said normal position the valve-controlled conduit 45 is closed to stop the flow of liquid through opening 49, so that there will no longer be any interference with the conveying of the sink product to its point of discharge.

While I have thus far described the performance of the present process in apparatus using a spiral conveyor, it will be obvious that other types of conveyors may be utilized in the performance of the process with effective results. In such apparatus the circulatory system will be substantially the same as heretofore described, and if it is desired to control the operation after shutdowns to prevent depletion of the medium of the tank, a suitable control arrangement can be included in such apparatus.

Fig. 9 illustrates such an arrangement applied to apparatus having a conveyor of either the reciprocating rake or Esparanza type. The structure illustrated is more or less diagrammatic and includes a tank $T^2$ of rectangular section, the bottom 50 of which is inclined in the manner hereinbefore described to form a lower pool (not shown) in which the separation is obtained.

The section represented by Fig. 9 is taken near the top discharge end of the tank looking in the direction of the discharge end. The conveyor member designated generally by the reference letter R may be either a reciprocating rake element or a drag element as aforesaid. A header H is located at the upper end of the tank on or near the bottom 50 and is supplied with circulating liquid from the pool through a pipe or conduit 51 which extends through a wall of the tank and connects to header H. The header extends through substantially the width of the tank and has at intervals throughout its length a series of nozzles or jets 52 directed along the downhill side of the header. The liquid or fluent medium thus introduced into the header and passing from said nozzles washes the bed of material being conveyed upwardly by conveyor member R and washes therefrom substantial quantities of entrained medium which drain back into the pool.

While I have shown this circulating feature as applied to apparatus of the general type of the Dorr-type classifier, it will be apparent that when desired, the same type of control may be incorporated in a spiral type unit by making the header conform to the shape of the bottom of the tank and providing adequate clearance for the spiral blades over the header.

From the foregoing description, it will be apparent that the novel methods of the present invention may be performed in a variety of apparatus and where necessary the control features may be incorporated into existing plant installations by simple structural changes. The density controls and control of the retention interval within the pool insure a clean and efficient separation with a variety of ores and at low treatment cost. By adapting the apparatus to resume operation without depleting the medium content of the pool, valuable savings in treatment time are effected.

In order to demonstrate the effectiveness of the heavy media separation of the present invention, a unit of the type shown in Fig. 5 was arranged to operate alongside a conventional cone separator, with the feed divided to pass to each separating unit. Two different types of ore were used in this comparative testing and regular samples were taken at equal intervals of the feed, float product, and sink product of both separators. These samples were assayed for Fe and $SiO_2$ content, which were the two compositions that determined the quality of the product and the efficiency of the separation. The first testing involved the treatment of so-called Mace ore which was a mixture in which the hematite and silica could be separated at a relatively low specific gravity of medium. The other so-called North Harrison ore contains silica in the form of taconite, which is an intimate mixture of silica and iron which requires a high medium specific gravity to float the taconite away from the hematite.

The results of these tests are shown in the following tabulations:

COMPARATIVE ASSAY RESULTS

TABLE A

*Mace ore*

[Medium=3.00 sp. gr.]

| Sample | Atkins Separator | | Cone Separator | |
|---|---|---|---|---|
| | Fe | $SiO_2$ | Fe | $SiO_2$ |
| Feed | 55.03 | 15.49 | 56.82 | 13.82 |
| Sink prod | 62.11 | 5.94 | 58.77 | 9.75 |
| Float prod | 37.93 | 38.18 | 50.30 | 22.56 |

TABLE B

*North Harrison ore*

[Medium=3.15 sp. gr.]

| Sample | Atkins Separator | | Cone Separator | |
|---|---|---|---|---|
| | Fe | $SiO_2$ | Fe | $SiO_2$ |
| Feed | 56.68 | 15.87 | 53.10 | 20.30 |
| Sink prod | 60.58 | 9.87 | 60.25 | 10.14 |
| Float prod | 39.95 | 36.78 | 39.46 | 39.63 |

The foregoing testing demonstrates that the heavy media separator of the present invention is able to obtain metallurgical results that are at least slightly superior to the results obtained with the cone separators now commonly used in such treatments. In addition, the classifier-type separator permits lower cost operation and simplifies the plant arrangement for treating the products of the separation.

Figure 8:
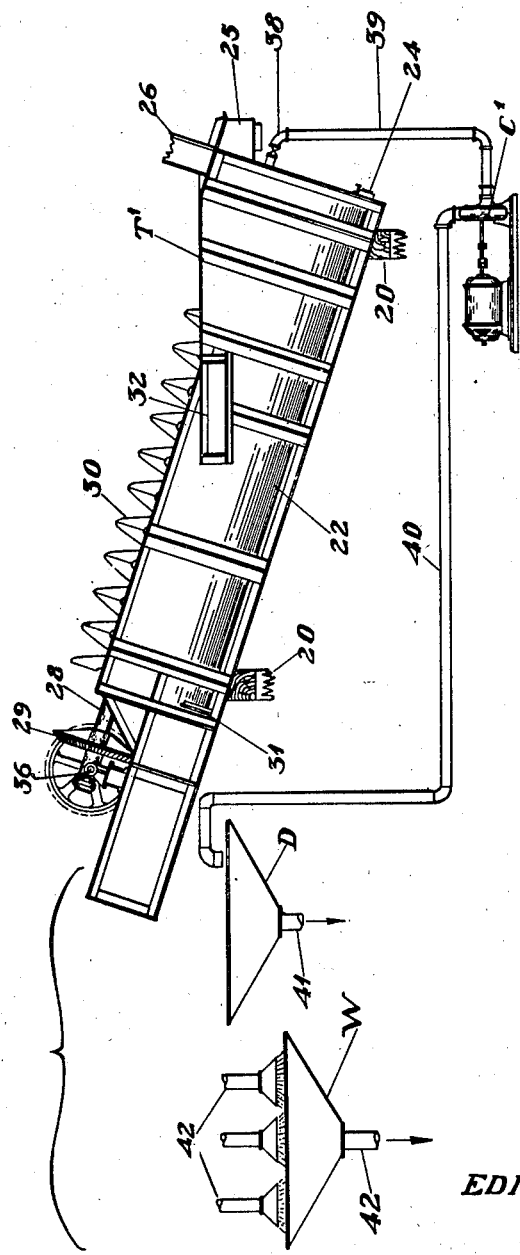
Fig. 8 is a fragmentary side elevation of separator apparatus embodying features of my invention in relation to other apparatus utilized in the heavy-media separation of ores.

With further reference to the circulatory system shown in Fig. 8, there are at least three methods of conveying medium to the drainage screen D which would be suited for commercial usage. The first of these is the arrangement illustrated in Fig. 8. In addition, it will be possible with proper plant arrangement to deliver the medium from the pool in the separator to the screen D by gravity flow, and where there is not sufficient head room for a gravity system, the medium may also be delivered by by-passing a portion of the circulating medium pump discharge.

In the foregoing description, the treatments cited have involved operations in which the valuable constituents form the sink product and gangue constituents form the float product. It will be understood that the treatment methods of the present invention may be utilized in other separations, as coal from slate for example, where the slate or other waste matter would form the sink product, and the valuable constituent coal would be discharged as the floated product.

It should be noted that while I prefer to use a side feed and back overflow arrangement, it is possible to operate effectively with apparatus having a back feed and side overflow. Therefore, the accompanying drawings are intended merely to illustrate the practice of the present invention and I do not desire my invention to be limited to operations performed in the particular construction and arrangement shown and described, as I intend by the accompanying claims to cover all the procedure within one spirit and scope of my invention.

What I claim and desire to secure by Letters Patent is:

1. In a heavy-media ore concentration treatment, in which the normally suspended solids constituents of a mixture of ore, heavy media and a carrying liquid have settled into a bed within a pool having an inclined bottom, by being allowed to remain in a quiescent state for a substantial time interval, the improvement which comprises initially subjecting the bed to a raking action directed at the top of the settled solids and moving said raking action downwardly through the bed as it loosens, and portions of its solids content are again suspended in said liquid, directing said raking action through the pool so as to move the contents of the bed progressively along the inclined bottom and out of said pool along an extension of the inclined course to a point of discharge substantially higher than the surface of the pool, removing liquid from the pool at a point below but in proximity to its surface, washing the surface of the bed moving upwardly away from said pool in the raking action by discharging said withdrawn liquid on said surface, and continuing said circulation and raking until equilibrium is established in the pool.

2. In a heavy-media ore concentration treatment, in which the normally-suspended solids constituents of a mixture of ore, heavy media and a carrying liquid have settled into a bed within a pool having an inclined bottom, by being allowed to remain in a quiescent state for a substantial time interval, the improvement which comprises initially subjecting the bed to a raking action directed at the top of the settled solids and moving said raking action downwardly through the bed as it loosens, and portions of its solids content are again suspended in said liquid, directing said raking action at a controlled rate through the pool so as to move the contents of the bed progressively along the inclined bottom and out of said pool along an extension of the inclined course to a point of discharge substantially higher than the surface of the pool, removing liquid from the pool at a point below but in proximity to its surface, washing the surface of the bed moving upwardly away from said pool in the raking action by discharging said withdrawn liquid on said surface, and continuing said circulation and raking until equilibrium is established in the pool.

EDMUND C. BITZER.

REFERENCES CITED

The following references are of record in the file of this patent:

UNITED STATES PATENTS

| Number | Name | Date |
|---|---|---|
| 1,984,362 | Dickson | Dec. 18, 1934 |
| 2,320,519 | Hirst | June 1, 1943 |
| 2,347,264 | Holt | Apr. 25, 1944 |
| 2,353,152 | Erck | July 11, 1944 |
| 2,356,648 | Brusset | Aug. 22, 1944 |
| 2,368,416 | Holt | Jan. 30, 1945 |
| 2,378,257 | Erck | June 12, 1945 |
| 2,378,356 | Erck | June 12, 1945 |